United States Patent
Kim

(12) United States Patent (10) Patent No.: US 6,642,896 B2
(45) Date of Patent: Nov. 4, 2003

(54) READER COIL ANTENNA, AND NON-CONTACTING TYPE CARD IDENTIFICATION SYSTEM USING THE SAME

(75) Inventor: Tae-Ho Kim, Yongin (KR)

(73) Assignee: Samsung Electronics Co., Ltd., Kyungki-do (KR)

(\*) Notice: Subject to any disclaimer, the term of this patent is extended or adjusted under 35 U.S.C. 154(b) by 0 days.

(21) Appl. No.: 10/061,352

(22) Filed: Feb. 4, 2002

(65) Prior Publication Data

US 2002/0105470 A1 Aug. 8, 2002

(30) Foreign Application Priority Data

Feb. 3, 2001 (KR) .......................................... 2001-5286

(51) Int. Cl.[7] .............................................. H01Q 11/12
(52) U.S. Cl. ...................................... 343/742; 343/867
(58) Field of Search ................................ 343/867, 866, 343/741, 742; H01Q 11/12

(56) References Cited

U.S. PATENT DOCUMENTS

| 4,857,893 | A | | 8/1989 | Carroll |
| 5,541,399 | A | * | 7/1996 | de Vall .......................... 343/895 |
| 6,165,567 | A | | 12/2000 | Ventzek et al. |
| 6,176,433 | B1 | | 1/2001 | Uesaka et al. |
| 6,385,407 | B1 | * | 5/2002 | Inose .......................... 399/24 |
| 2002/0089049 | A1 | * | 7/2002 | Leduc et al. .................. 343/895 |
| 2003/0025186 | A1 | * | 2/2003 | Leduc et al. .................. 257/679 |

FOREIGN PATENT DOCUMENTS

| DE | 197 01 167 A1 | 7/1998 |
| EP | 0 948 083 A2 | 10/1999 |

\* cited by examiner

*Primary Examiner*—Hoanganh Le
(74) *Attorney, Agent, or Firm*—Sughrue Mion, PLLC

(57) ABSTRACT

The present invention discloses a reader coil antenna, and a non-contacting type card identification system using the same for increasing the sensing region of the card reader system. The reader coil antenna includes an outer coil for forming a predetermined loop, and which forms a magnetic field by receiving a current, along with at least one inner coil disposed inside the loop of the outer coil, for generating a constructive interference in a direction of the magnetic field of the outer coil. The card identification system, of the present invention, includes a reader coil antenna which forms a magnetic field due to a signal applied to flow in a single direction, a card reader for transmitting an operating signal through the reader coil antenna, and decoding an input signal from a non-contacting type card, and a control unit for deciding identification of the non-contacting type card according to the decoded signal.

17 Claims, 4 Drawing Sheets

US 6,642,896 B2

READER COIL ANTENNA, AND NON-CONTACTING TYPE CARD IDENTIFICATION SYSTEM USING THE SAME

BACKGROUND OF THE INVENTION

1. Field of the Invention

The present invention relates to a reader coil antenna, and a non-contacting type card identification system using the same, and more particularly to an improved reader coil antenna which can form a magnetic field, transmit an operating frequency, and receive a frequency from a non-contacting type card in order to decode data of the non-contacting type card, and a non-contacting type card identification system using the same.

2. Description of the Related Art

Both a contacting type magnetic card having a magnetic strip portion which is rubbed for identification, and a non-contacting type card which transmits/receives data by frequency in a magnetic field space have been generally used as means for making payment. Examples of magnetic cards are credit cards and pre-paid telephone cards, while examples of the non-contacting type card are pre-paid transportation cards, and non-contacting type subway credit cards.

FIG. 1 is a block diagram illustrating a conventional non-contacting type card identification system. Referring to FIG. 1, the conventional non-contacting type card identification system 10 includes an antenna system 16, a card reader 18 and a control unit 20.

The card reader 18 generates a current to sense a non-contacting type card 14, and transmits a magnetic field formed by the current through the antenna system 16.

The non-contacting type card 14 manually charges a battery by the transmitted magnetic field, and transmits a signal including an internally-stored data to the antenna system 16.

The signal received in the antenna system 16 is output to the control unit 20 through the card reader 18.

The signal received in the control unit 20 is compared with master security information (not shown) stored in the control unit 20 to decide card identification, and is transmitted through the antenna system 16.

Further, the antenna system 16 includes a reader coil antenna, and generates the magnetic field by the applied current to the reader coil antenna and receives the signal from the non-contacting type card 14.

FIG. 2 is a perspective diagram illustrating a conventional reader coil antenna. As shown therein, the conventional reader coil antenna includes a driving loop antenna 22, double loop antennas 32, 34 and a non-magnetic conductive material 26.

Here, the double loop antennas 32, 34 are connected to each other in a cross-over type connection 36. In addition, the non-magnetic conductive material 26 contains aluminum, silver, copper, brass or gold to induce the magnetic field of the driving loop antenna 22 by providing a shield against an eddy current. A driving current for driving the non-contacting type card 14 is applied to terminals 28, 30 connected to the card reader 18. The magnetic field is generated in the driving loop antenna 22 due to the applied current. Here, an induced current is generated in the double loop antennas 32, 34 by the driving loop antenna 22. The induced current has a phase difference of 180° from a direction of the current flowing through the driving loop antenna 22.

The double loop antennas 32, 34 are adhered to the surface of the non-magnetic conductive material 26. Accordingly, the magnetic field is generated on the front surface of the antenna system 16 where the non-contacting type card 14 is positioned, but induced and absorbed on the rear surface thereof.

In the above-described reader coil antenna, the driving loop antenna 22 and the double loop antennas 32, 34 have the opposite current direction. It is thus difficult to increase a reading distance which is the data recognition distance between the antenna system 16 and the non-contacting type card 14. Moreover, the non-magnetic conductive material 26 induces and absorbs the magnetic field, thus reducing strength of the magnetic field. As a result, the reading distance due to the magnetic field is further shortened.

SUMMARY OF THE INVENTION

Accordingly, an object of the present invention is to provide a reader coil antenna which can increase the reading distance, where a non-contacting type card is read, due to strength of an internal magnetic field, and a non-contacting type card identification system using the same.

In one aspect of the present invention, a reader coil antenna of a non-contacting type card identification system includes: an outer coil forming a predetermined loop, and forming a magnetic field by receiving a current; and at least one inner coil disposed inside the loop of the outer coil, for generating a constructive interference in a direction of the magnetic field of the outer coil by receiving a current.

In another aspect of the present invention, a non-contacting type card identification system using a reader coil antenna includes: the reader coil antenna for forming a magnetic field due to a signal applied to flow in an identical direction; a card reader for transmitting an operating signal through the reader coil antenna, and decoding an input signal from a non-contacting type card; and a control unit for deciding identification of the non-contacting type card according to the decoded signal.

According to the present invention, a sensing region of the center portion of the coil is increased due to the reader coil antenna provided with the identical direction current. In addition, strength of the magnetic field is increased near the center portion of the coil, by inserting a non-conductive magnetic material into the inner coil. As a result, the sensing region is increased, communication reliability is improved, and a dead zone is reduced.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A reader coil antenna, and a non-contacting type card identification system using the same in accordance with the present invention will now be described with reference to the accompanying drawings.

Figure 1:
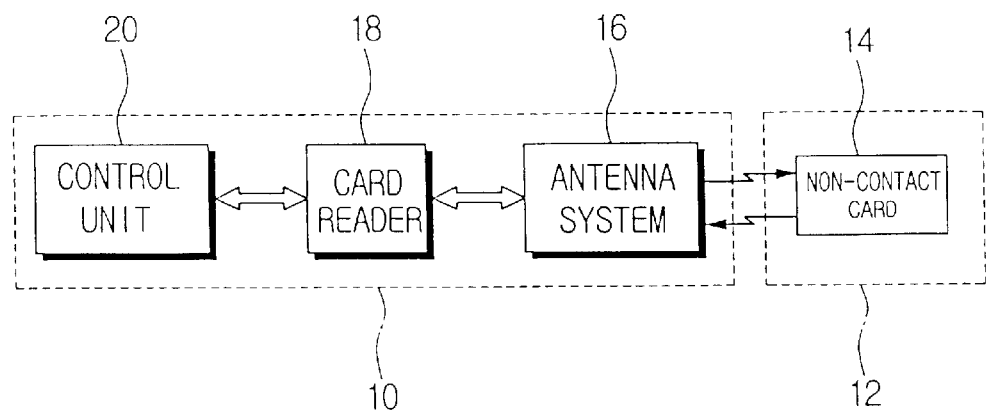
FIG. 1 is a block diagram illustrating a conventional non-contacting type card identification system.
Figure 2:
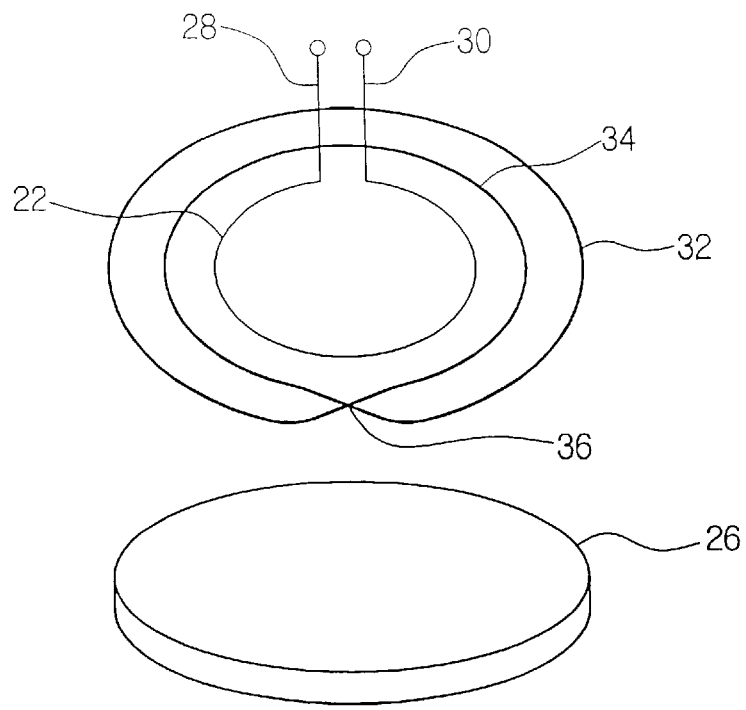
FIG. 2 is a perspective diagram illustrating a reader coil antenna in FIG. 1.
Figure 3:
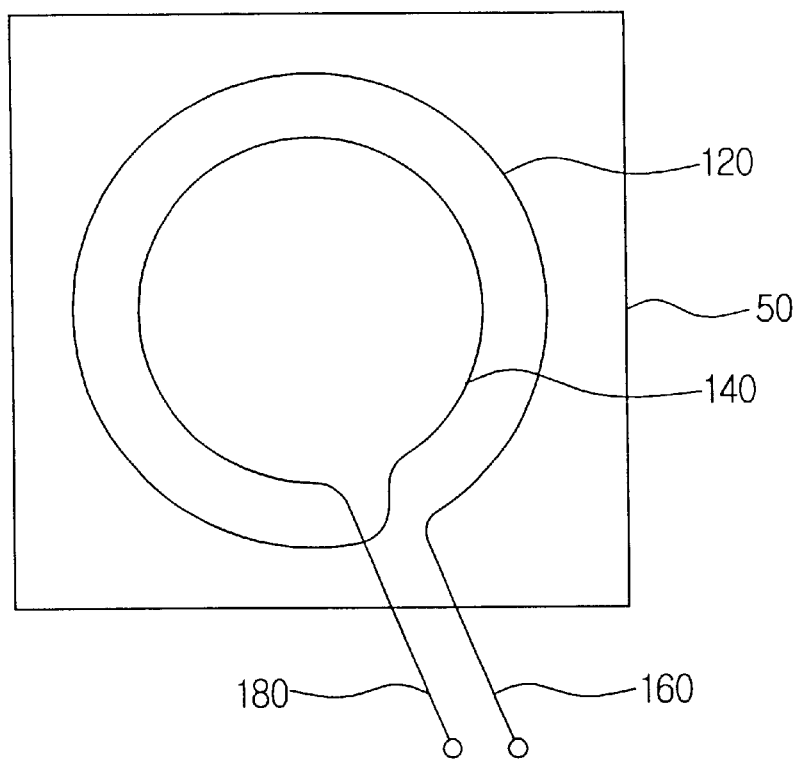
FIG. 3 is a top diagram illustrating a reader coil antenna in accordance with a first embodiment of the present invention.
Figure 4:
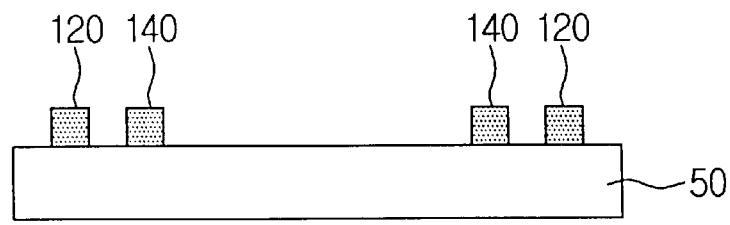
FIG. 4 is a cross-sectional diagram illustrating the reader coil antenna in FIG. 3.

FIG. 3 is a top diagram illustrating a reader coil antenna in accordance with a first embodiment of the present invention, and FIG. 4 is a cross-sectional diagram illustrating the reader coil antenna in FIG. 3. The reader coil antenna includes an outer coil 120 and an inner coil 140 for forming a magnetic field due to an applied current.

Here, the inner coil 140 is disposed inside the outer coil 120. The outer coil 120 and the inner coil 140 are incorporated into one coil. In addition, the outer coil 120 and the inner coil 140 are respectively connected to terminals 160, 180 which are signal input/output paths. One line of the terminals 160, 180 is used as an input line, and the other line is used as a ground line. In this embodiment, the outer terminal 160 connected to the outer coil 120 is used as the input line of signals, and the inner terminal 180 connected to the inner coil 140 is used as the ground line.

The outer coil 120 and the inner coil 140 are mounted on a printed circuit board 50 to prevent movement.

When a driving current is applied to the outer terminal 160, the identical direction current flows through the outer coil 120 and the inner coil 140. Accordingly, a magnetic field is generated near the coil. Here, the magnetic field is formed in a single direction, and in a space surrounded by the inner coil 140, which adds strength to the magnetic field in a vertical direction (with respect to the surface of the printed circuit board 50, on which the coils are mounted).

The more the outer coil 120 is separated from the inner coil 140, the more the strength of the magnetic field 140 is increased in the inner coil 140. However, when the interval between the outer coil 120 and the inner coil 140 reaches a predetermined value, namely where a diameter of the inner coil 140 is excessively small, the strength of the magnetic field of the inner coil 140 is reduced.

Preferably, the coils 120, 140 are a made from thin films plated with copper, and are a few tens μm in thickness.

The interval between the outer coil 120 and the inner coil 140 is preferably an optimal distance decided by experiments. Generally, the diameter of the coils 120, 140 ranges from 30 to 40 μm, and the interval between the outer coil 120 and the inner coil 140 ranges from 20 to 30 mm. Preferably, when the outer diameter of the coil 120 is 35 μm, and the inner diameter of the inner coil 140 is 25 mm, the maximum strength of the magnetic field is obtained in the inner coil 140 in a vertical direction.

Figure 5:
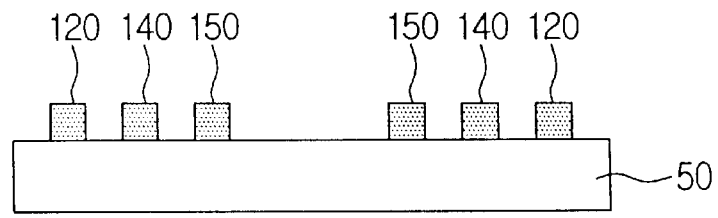
FIG. 5 is a cross-sectional diagram illustrating a reader coil antenna in accordance with a second embodiment of the present invention.

FIG. 5 is a cross-sectional diagram illustrating a reader coil antenna in accordance with a second embodiment of the present invention. Here, identical units to the first embodiment are provided with the same reference numerals. The reader coil antenna includes an outer coil 120, a first inner coil 140 and a second inner coil 150. When the two inner coils 140, 150 are employed, the magnetic field generated in the second inner coil 150 is stronger than the magnetic field generated in the inner coil 140 of the first embodiment. Accordingly, the inner coil may be provided in a multiple number, as shown in FIG. 5.

Figure 6:
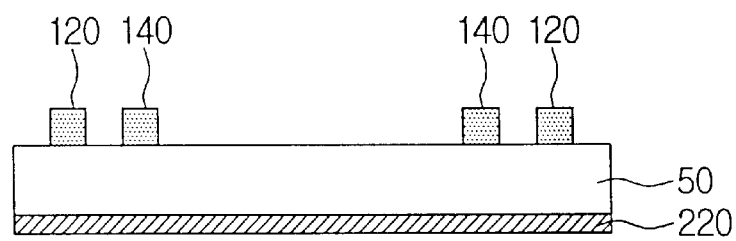
FIG. 6 is a cross-sectional diagram illustrating a reader coil antenna in accordance with a third embodiment of the present invention.

FIG. 6 is a cross-sectional diagram illustrating a reader coil antenna in accordance with a third embodiment of the present invention. In the reader coil antenna, a magnetic inducing layer 220 consisting of a non-conductive magnetic material is plated on the rear surface of a printed circuit board 50 where coils 120, 140 are adhered. The non-conductive magnetic material does not have electric conductivity, and has magnetism when positioned in a magnetic field space.

According to the present invention, the magnetic field exists on the rear surface of the printed circuit board 50. The magnetic inducing layer 220 induces a direction of the magnetic field on the rear surface to the printed circuit board 50. In this embodiment, the induced magnetic field is combined with the magnetic field of a coil direction, to generate a constructive phenomenon. It is thus possible to increase a sensing region due to the current identically applied to the coils, and to reduce discharge of the magnetic field to the rear surface of the printed circuit board 50.

Induction of the magnetic field is dependent upon a thickness of the magnetic inducing layer 220. Preferably, when the thickness of the printed circuit board 50 ranges from 0.3 to 0.9 mm, the thickness of the magnetic inducing layer 220 ranges from 1 to 3 mm.

In addition, the magnetic inducing layer 220 may be screen-printed on the rear surface of the printed circuit board 50.

Figure 7:
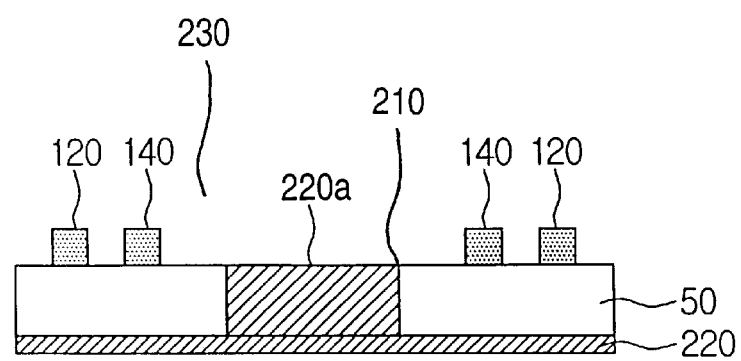
FIG. 7 is a cross-sectional diagram illustrating a reader coil antenna in accordance with a fourth embodiment of the present invention.

FIG. 7 is a cross-sectional diagram illustrating a reader coil antenna in accordance with a fourth embodiment of the present invention. The third and fourth embodiments of the present invention use the same reference numerals. A groove 210 is formed on a printed circuit board 50, in an internal region 230 created by the inner coil 140. A magnetic inducing layer 220a is correspondingly inserted into the groove 210, and adhered to the rear surface of the printed circuit board 50.

The magnetic inducing layer 220 adhered to the rear surface of the printed circuit board 50 is operated as in the third embodiment of the present invention.

The magnetic inducing layer 220a inserted in from the inner coil 140, in the internal region 230, forms a magnetic field induced in the same direction as by the magnetic inducing layer 220 adhered to the rear surface of the printed circuit board 50, which is in a vertical direction to the coil surface, and maintains a maximum magnitude of a vertical magnetic flux passing the non-contacting type card. Therefore, the vertical magnetic flux is increased in the inner coil 140, thus reinforcing the strength of the internal magnetic field. In addition, the magnetic inducing layer 220a may be coated on the surface of the printed circuit board 50, instead of forming the groove 210.

Further, a thickness of the magnetic inducing layer 220a correspondingly inserted into the groove 210 of the printed circuit board 50 140 is almost identical to a thickness of the printed circuit board 50.

Figure 8:
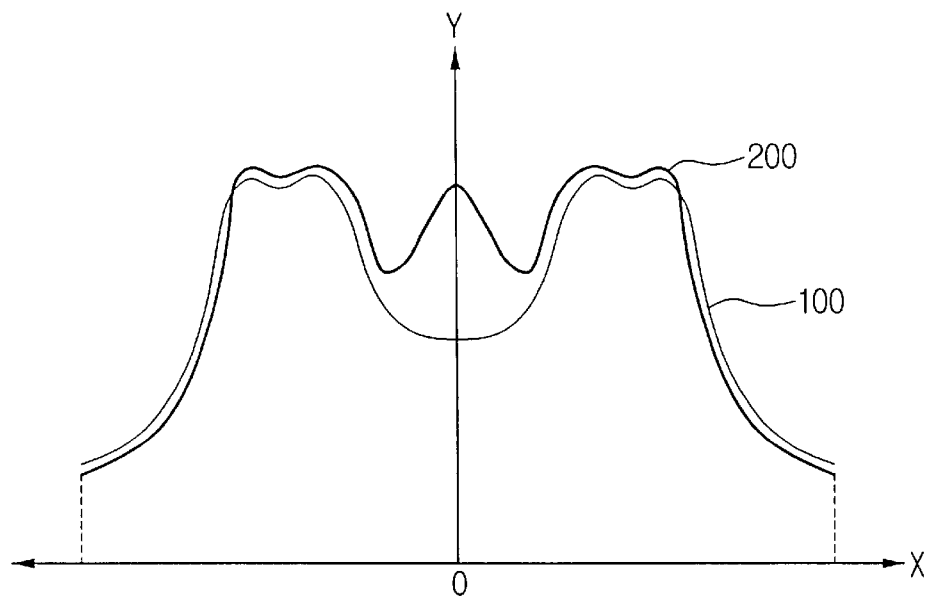
FIG. 8 is a graph showing strength of a magnetic field according to a coil diameter in FIGS. 3 and 7.

FIG. 8 is a graph showing the strength of the magnetic field according generated by the embodiments shown in FIGS. 3 and 7. Referring to FIG. 8, a thin line 100 denotes the strength of the magnetic field generated by the embodiment shown in FIG. 3, and a thick line 200 denotes the strength of the magnetic field generated by the embodiment shown in FIG. 7.

In the thin line 100, the strength of the magnetic field is smaller in the center portion than the coil position. In the thick line 200, the strength of the magnetic field is almost identical in the coil position, but changes at the center portion where the magnetic inducing layer 220a is inserted. As shown, the strength of the magnetic field is increased in the coil center portion due to the magnetic inducing layer 220a.

Figure 9:
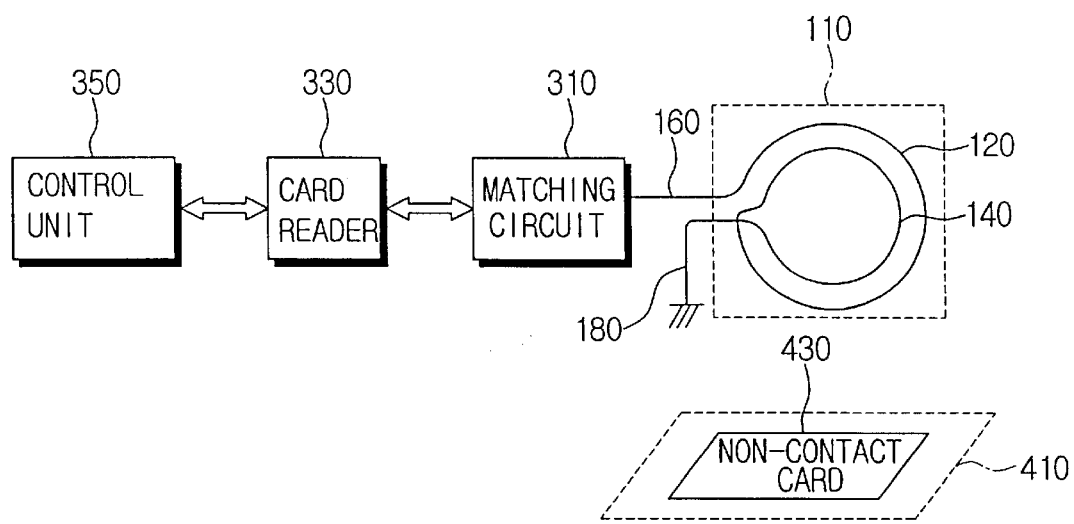
FIG. 9 is a block diagram illustrating a non-contacting type card identification system using the reader coil antenna in FIG. 3.

FIG. 9 is a block diagram illustrating a non-contacting type card identification system using the reader coil antenna shown in FIG. 3. The non-contacting type card identification system includes a reader coil antenna 110, a card reader 330 and a control unit 350. Preferably, the non-contacting type card identification system further includes a matching circuit 310 for controlling input/output signals of the reader coil antenna 110 and the card reader 330.

Reference numeral 410 denotes a sensing region by the reader coil antenna 110, and 430 denotes a non-contacting type card.

The card reader 330 transmits an operating frequency including power and a signal through the reader coil antenna 110. In this example, the operating frequency is 13.56 MHz.

The operating frequency outputted from the card reader 330 through the matching circuit 310 generates a magnetic field in the reader coil antenna 110. At this time, the magnetic field is weak between the coils 120, 140 due to a destructive interference, but strong near the coils 120, 140 due to a constructive interference. Thus, the sensing region formed by the identical operating frequency is increased.

An inducing electromotive force is accumulated in the non-contacting type card 430 due to the discharged magnetic field, and then discharged to the reader coil antenna 110 with the stored information.

The received signal is input to the card reader 330 through the matching circuit 310. The card reader 330 reads, amplifies, filters and decodes the data. The control unit 350 decides identification according to the decoded signal.

According to the present invention, the sensing region of the center portion of the coil is increased due to the reader coil antenna provided with the identical (or single) direction current. In addition, the non-conductive magnetic material is adhered to the rear surface of the printed circuit board, and thus the magnetic field is not generated thereon. It is thus possible to control discharge of the magnetic field in an unwanted direction. Moreover, the strength of the magnetic field is increased near the center portion of the coil, by inserting the non-conductive magnetic material in from the inner coil, as shown in FIG. 7. As a result, the sensing region for the system is increased, communication reliability is improved, and the size of a dead zone is reduced.

The coils shown and discussed above are formed in a circular shape, but may be formed in various shapes to apply the identical direction current to the outer coil and the inner coil.

Further, in the embodiments shown and discussed above, the outer coil and the inner coil have the identical center portion, or a common center point. However, it should be noted that as long as the inner coil is positioned inside of the outer coil, the outer coil and the inner coil may have different center portions, or center points.

In addition, in the above discussed embodiments, the coils are mounted on the printed circuit board. However, the printed circuit board may not be required if the coil position and the current direction are made and used in accordance with the present invention.

Although the preferred embodiments of the present invention have been described, it is understood that the present invention should not be limited to these preferred embodiments, and that various changes and modifications can be made by one skilled in the art within the spirit and scope of the present invention as hereinafter claimed.

What is claimed is:

1. A reader coil antenna of a non-contacting type card identification system, comprising:
    an outer coil forming a predetermined loop, and forming a magnetic field by receiving a current; and
    at least one inner coil disposed inside the loop of the outer coil, wherein said at least one inner coil generates a constructive interference in a direction of the magnetic field formed by the outer coil,
    wherein the outer coil and the inner coil are mounted on a printed circuit board, and wherein one side of the printed circuit board comprises a magnetic inducing layer coated with a non-conductive magnetic material.

2. The reader coil antenna according to claim 1, having at least two inner coils and wherein the inner coils are sequentially disposed in an internal direction from said outer coil.

3. The reader coil antenna according to claim 2, wherein one inner coil is used.

4. The reader coil antenna according to claim 1, wherein an identical direction current is supplied to both of said outer coil and said at least one inner coil.

5. The reader coil antenna according to claim 1, wherein the outer coil and the inner coil are incorporated into one coil.

6. The reader coil antenna according to claim 1, wherein the outer coil and the inner coil are formed in a circular loop.

7. The reader coil antenna according to claim 6, wherein the outer coil and the inner coil are concentrically aligned.

8. The reader coil antenna according to claim 1, wherein the outer coil and the inner coil consist of copper having a thickness of 30 to 40 $\mu$m.

9. The reader coil antenna according to claim 7, wherein a diameter of said circular loop of the inner coil ranges from 6 to 10 mm.

10. The reader coil antenna according to claim 1, wherein said inner coil creates an internal region inside of said inner coil and said magnetic inducing layer is disposed in said internal region.

11. The reader coil antenna according to claim 10, wherein a groove is formed in the internal region of the printed circuit board, and the magnetic inducing layer is correspondingly inserted into the groove.

12. The reader coil antenna according to claim 11, wherein the groove formed on the printed circuit board has a shape corresponding to the shape of said internal region.

13. A non-contacting type card identification system using a reader coil antenna, comprising:
    a reader coil antenna which forms a magnetic field from a signal applied to flow in an single direction;
    a card reader to transmit an operating signal through the reader coil antenna, and decode an input signal from a non-contacting type card; and
    a control unit to decide identification of the non-contacting type card according to the decoded signal,
    wherein the reader coil antenna comprises:
        an outer coil forming a predetermined loop, and forming a magnetic field by receiving a current; and at least one inner coil disposed inside the loop of the outer coil, wherein said at least one inner coil generates a constructive interference in a direction of the magnetic field formed by the outer coil, and wherein the outer coil and the inner coil are mounted on a printed circuit board, and wherein one side of the printed circuit board comprises a magnetic inducing layer coated with a non-conductive magnetic material.

14. The system according to claim 13, further comprising a matching circuit disposed between the card reader and the reader coil antenna, said matching circuit matching signals of the reader coil antenna and the card reader.

15. The system according to claim 13, wherein the outer coil and the inner coil are incorporated into one coil.

16. The system according to claim 13, wherein said inner coil creates an internal region inside of said inner coil and said magnetic inducing layer is disposed in said internal region.

17. The system according to claim 16, wherein a groove is formed in the internal region of the printed circuit board, and the magnetic inducing layer is correspondingly inserted into the groove.

* * * * *